US012661765B2

(12) United States Patent
Sikora et al.

(10) Patent No.: US 12,661,765 B2
(45) Date of Patent: Jun. 23, 2026

(54) FASTENING TOOL HAVING A MAGAZINE PUSHER POSITION DETECTION SYSTEM

(71) Applicant: Black & Decker, Inc., New Britain, CT (US)

(72) Inventors: Michael Sikora, Baltimore, MD (US); Luke Moloznick, Baltimore, MD (US)

(73) Assignee: BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 18/387,998

(22) Filed: Nov. 8, 2023

(65) Prior Publication Data

US 2024/0075601 A1 Mar. 7, 2024

Related U.S. Application Data

(63) Continuation of application No. PCT/US2022/025640, filed on Apr. 20, 2022.

(60) Provisional application No. 63/177,044, filed on Apr. 20, 2021.

(51) Int. Cl.

*B25C 1/00* (2006.01)
*B25C 1/04* (2006.01)
*B25C 1/06* (2006.01)

(52) U.S. Cl.

CPC .............. *B25C 1/008* (2013.01); *B25C 1/005* (2013.01); *B25C 1/047* (2013.01); *B25C 1/06* (2013.01)

(58) Field of Classification Search

CPC ......... B25C 1/008; B25C 1/005; B25C 1/047; B25C 1/06; B25C 5/1689; B25C 1/001; B25C 1/04; B25C 1/08; B25C 1/00

See application file for complete search history.

(56) References Cited

U.S. PATENT DOCUMENTS 4,776,242 A 10/1988 Poux et al.
5,733,093 A 3/1998 Palm et al.
5,794,831 A * 8/1998 Velan ...................... B25C 1/001 227/9
5,911,350 A 6/1999 Bolger et al.
8,701,956 B2 4/2014 Takemura et al.
(Continued)

FOREIGN PATENT DOCUMENTS

WO 2021242305 A1 12/2021

OTHER PUBLICATIONS

International Search Report and Written Opinion, PCT Application No. PCT/US2022/025640, Jul. 25, 2022, 7 pages, USPTO.
(Continued)

*Primary Examiner* — Veronica Martin
(74) *Attorney, Agent, or Firm* — Rhonda L. Barton

(57) ABSTRACT

A fastening tool having a magazine pusher position detection system that informs the tool of a dry fire state due to less than a predetermined number of fasteners in the magazine assembly. The magazine pusher position detection system includes a sensor and a sensor target having a characteristic that is sensed by the sensor. When the characteristic is interrupted by an external member on the pusher, the sensor sends a signal to the controller indicative of a “low nail” or a “low fastener” condition. This can be done magnetically or optically. The controller then initiates a dry fire lockout that prevents the tool from driving a fastener, and actuates an indicator that notifies the user of a “low nail” or “low fastener” condition.

25 Claims, 11 Drawing Sheets

(56) References Cited

U.S. PATENT DOCUMENTS

| | | | |
|---|---|---|---|
| 9,150,360 | B1 | 10/2015 | Wong et al. |
| 10,414,033 | B2 | 9/2019 | Ekstrom et al. |
| 2005/0001000 | A1 | 1/2005 | Favre-Bulle et al. |
| 2005/0220445 | A1 | 10/2005 | Baskar et al. |
| 2010/0294824 | A1 | 11/2010 | Takemura et al. |
| 2014/0100687 | A1 | 4/2014 | Ekstrom et al. |
| 2015/0298308 | A1 | 10/2015 | Kato |
| 2015/0306753 | A1* | 10/2015 | Po ............................. B25C 1/06 227/109 |
| 2017/0282238 | A1 | 10/2017 | Lewis et al. |

OTHER PUBLICATIONS

International Preliminary Report on Patentability, PCT Application No. PCT/US2022/025640, Oct. 24, 2023, 6 pages, WIPO.
Extended European Search Report, EP Application No. 22792449.5, Dec. 3, 2024, 9 pages, EPO.

* cited by examiner

FASTENING TOOL HAVING A MAGAZINE PUSHER POSITION DETECTION SYSTEM

CROSS-REFERENCE TO RELATED APPLICATIONS

The present application claims priority to U.S. Provisional Patent Application Ser. No. 63/177,044, entitled "Fastening Tool Having a Magazine Pusher Position Detection System", filed Apr. 20, 2021 and is a continuation of international application PCT/US2022/025640, entitled "Fastening Tool Having a Magazine Pusher Positions Detection System", filed Apr. 20, 2022. The entirety of the above application is incorporated herein by reference.

BACKGROUND OF THE INVENTION

Field of the Invention

The present invention relates, in general, to the field of power tools. In particular, the present invention relates to a fastening or driving tool, such as a nailer and more particularly to improvements in such tools for preventing the dry firing of the tool. In particular, the present invention relates to a fastening tool having a magazine pusher position detection system that detects the position of the magazine pusher which would indicate that there is a predetermined low number or no fasteners in the magazine, thereby requiring a dry fire lockout assembly to engage. The dry fire lockout assembly prevents the firing of the tool when there is less than a predetermined number of fasteners remaining in the tool.

Description of the Related Art

Different types of fastening tools are known including portable pneumatically actuated devices, electrically actuated devices, hammer actuated devices, manual actuated devices, etc. Fastening tools, such as power nailers have become relatively common place in the construction industry. Battery-powered nailers are popular in the market.

A common characteristic of all these types of fastening tools is the provision of a drive track, a fastener driving element mounted in the drive track and a magazine assembly for receiving a supply of fasteners in stick formation and feeding successive leading fasteners in the stick laterally into the drive track to be driven outwardly thereof by the fastener driving element. During fastening users are often unaware that the magazine has been depleted of fasteners and continue to try to drive fasteners into a workpiece by pressing the trigger. This is known as a dry fire situation. A dry fire situation causes the tool to recoil from the force of the nosepiece against the workpiece. As a result, the nosepiece can leave an indentation on the workpiece. If the workpiece is a wood material, the wood can be damaged. Also, a user can have the workpiece held above ground for fastening and if no nail is driven, the workpiece can fall and be damaged.

Accordingly, there is a need in the art for a fastening tool that is capable of reliably detecting a low or no fastener condition in the magazine and preventing the firing of the tool when such a condition exists.

SUMMARY OF THE INVENTION

In an embodiment of the present invention the position of the magazine pusher is detected in order to determine whether there are a sufficient number for fasteners in the magazine to actuate the tool and drive a fastener.

In an embodiment of the present invention, a fastening tool includes a tool housing; a nosepiece assembly connected to the housing and including a fastener drive track having a drive axis; a magazine assembly including a magazine pusher slidably disposed in the magazine assembly for feeding a number of fasteners successively along a fastener channel to the fastener drive track of the nosepiece assembly; a driver member provided in the housing and configured for movement along the drive axis to drive a lead fastener into a workpiece; a motor disposed within the housing and configured to drive the driver member along the drive axis; a power source providing power to the motor; a controller configured to control a supply of power from the power source to the motor and initiate a drive cycle: a first sensor target and a second sensor target operatively connected to the magazine assembly and having a sensor target characteristic; and a sensor configured to sense the sensor target characteristic of the first sensor target and send a signal to the controller in response to a change in the sensor target characteristic of the first sensor target. When the controller receives the signal from the sensor, the controller inhibits the drive cycle.

In an embodiment, the first and second sensor targets are permanent magnets in which one magnet is a reference magnet and the other magnet is a coactive magnet. The magnets have a sensor target characteristic defined by a magnetic field.

In an embodiment, the sensor is a Hall effect sensor that senses the magnetic field of the reference magnet. A projecting portion of the magazine pusher can interrupt the sensor target characteristic or magnetic field of the reference magnet to create the change in the magnetic flux that is then sensed by the Hall effect sensor.

In an embodiment, of the present invention, a method of detecting the position of a magazine pusher to prevent a dry fire in a fastening tool includes a fastening tool having a nosepiece assembly including a fastener drive track having a drive axis, a magazine assembly including the magazine pusher slidably disposed in the magazine assembly for feeding a number of fasteners successively along a fastener channel to the fastener drive track of the nosepiece assembly, the magazine pusher having a projecting portion, and a controller configured to control a supply of power to the fastening tool and initiate a drive cycle. The method includes the steps of: providing a first sensor target and a second sensor target having a sensor target characteristic; and sensing the sensor target characteristic in a sensing zone and sending a first signal to the controller indicative of the sensor target characteristic to initiate a drive cycle; and sensing a change in the sensor target characteristic in the sensing zone and sending a second signal to the controller indicative of the change in the sensor target characteristic to inhibit the drive cycle.

In an embodiment of the present invention, a magazine pusher position detection system includes a system housing having a slot therethrough, the slot having a first side and a second side laterally opposite the second side; a reference magnet disposed in the housing and on a first side of the slot, the reference magnet having a north polarity and north polarity magnetic field; a coactive magnet disposed in the housing and on a second side of the slot opposite to the first side of the slot, the coactive magnet having a north polarity facing the north polarity of the reference magnet; and a Hall effect sensor arranged on the second side of the slot to sense the north polarity magnetic field from the reference magnet.

An interruption of the north polarity magnetic field of the reference magnet inhibits a drive cycle.

Additional features and benefits of the present invention are described, and will be apparent from, the accompanying drawings and the detailed description below.

BRIEF DESCRIPTION OF THE DRAWINGS

The numerous advantages of the present invention may be better understood by those skilled in the art by reference to the accompanying Figures. In the drawings, like reference numerals designate corresponding parts throughout the several views.

Corresponding reference numerals indicate corresponding parts throughout the several views of the drawings.

DETAILED DESCRIPTION OF THE INVENTION

Figure 1:
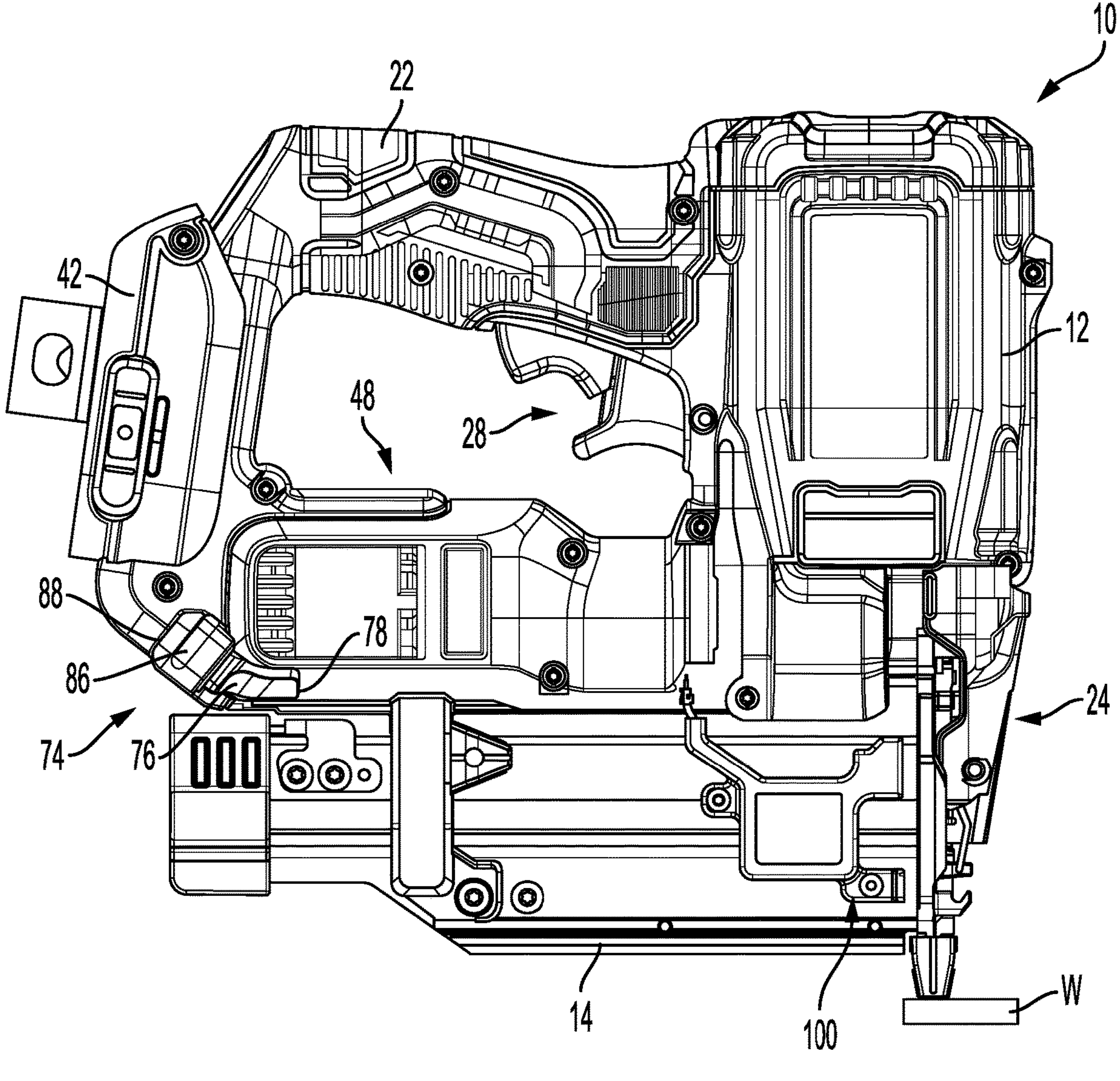
FIG. 1 is a side view of an exemplary fastening tool constructed in accordance with the teachings of the present invention.
Figure 2:
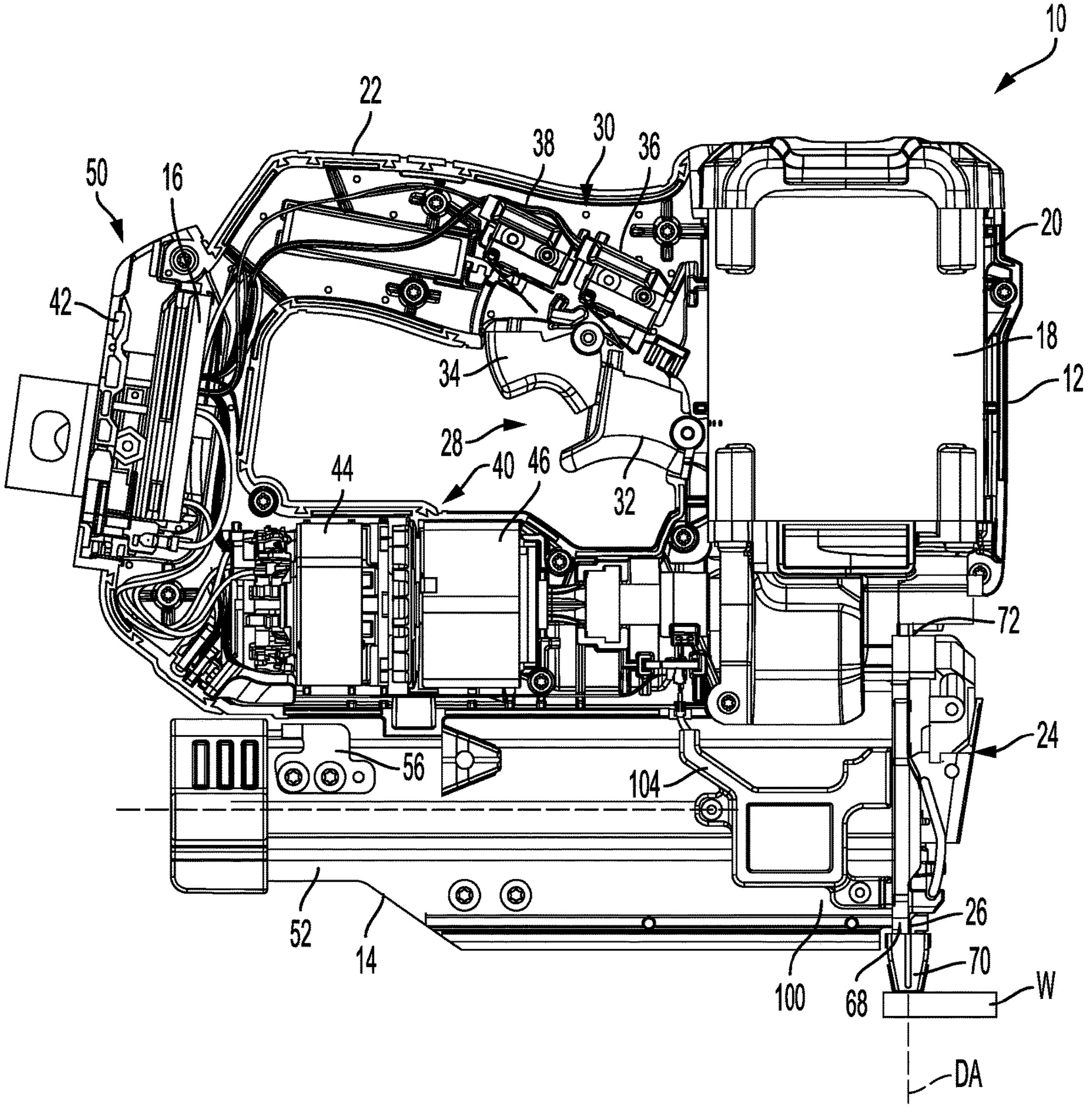
FIG. 2 is a side view of an exemplary fastening tool of FIG. 1 with a portion of the housing removed.

FIGS. 1 and 2 illustrate a fastening tool 10 according to an embodiment of the invention. In particular, FIGS. 1 and 2 illustrate the general characteristics and location of elements discussed below.

According to several aspects, the fastening tool 10 is a battery powered nailer, however the fastening tool can be any type of portable tool including a pneumatic nailer. The fastening tool 10 includes a housing 12, a nosepiece assembly 24 extending forward of and fixed to the housing 12, a control module or controller 16, a dry fire lockout assembly 100 and dry fire lockout indicator 84, and a magazine assembly 14 connected to a nose portion 24*a* of the nosepiece assembly. The nosepiece assembly 24 defines a fastener drive track 26 through which fasteners F, such as nails, are driven. The fastening tool 10 is designed to drive a fastener F into a workpiece W.

The fasteners can be nails, staples, brads, clips or any such suitable fastener that can be driven into the workpiece W.

In an embodiment, a no-mar tip 70 can be attached to the nose portion 24*a* of the nosepiece assembly 24 to prevent marring of the workpiece W when the nose portion 24*a* is placed against the workpiece for driving a fastener.

As illustrated in FIG. 2, the housing 12 includes a compression cylinder 18 in which a gas, such as air is compressed. In particular, the compression cylinder 18 contains a compression chamber 20 that is configured to receive a pressurized gas that is used to drive a driver member 72 having a driver blade (not shown) in the nosepiece assembly 24. The driver blade impacts the fastener F to drive the fastener into the workpiece W. The compression chamber 20 is substantially defined within the compression cylinder 18. The compression chamber 20 is configured to drive the fastener along a drive axis DA out of the fastener drive track 26 and into the workpiece W.

A handle portion 22 of the tool extends from the housing 12. The handle 22 is configured to be received by a user's hand, thereby making the fastening tool 10 portable. Additional portability can be achieved by constructing the housing 12 from a lightweight yet durable material, such as magnesium.

The trigger assembly 28 is pivotably connected to the handle 22. The trigger assembly 28 serves as an actuation device or actuator for the fastening tool 10, and is constructed and arranged to actuate a switch assembly 30. The trigger assembly 28 may be coupled to the housing 12 and is configured to receive an input from the user, typically by way of the user's finger(s), that may be employed in conjunction with the trigger switch assembly 30 to generate a trigger signal that may be employed in part by the controller 16 to initiate the drive sequence or drive cycle of the fastening tool 10 to drive the fastener F into the workpiece W.

The trigger assembly 28 includes a primary trigger 32 and a secondary trigger 34. The switch assembly 30 includes a primary switch 36 actuated by the primary trigger 32 and a secondary switch 38 is actuated by the secondary trigger 34. The primary and secondary triggers 32, 34 are pivotably mounted to the handle 22 so as to be grasped by the user's finger(s) when the user holds the tool by hand along the handle.

In operation, the secondary trigger 34 is pulled first to activate the secondary switch 38 which sends a signal to the controller to power the fastening tool. Upon detecting the actuation of the secondary trigger 34, the controller 16 can instruct the power source to deliver power to the fastening tool. Powering of the fastening tool includes the activation of any lights and sensors for checking for fasteners in the magazine assembly 14. After the secondary trigger 34 is pulled, the primary trigger 32 is actuated or pulled to activate the primary switch 36. The primary switch 36 sends a signal to the controller 16 to activate the drive assembly 40. The primary and secondary switches 36, 38 may be disposed within the handle portion 22 of the fastening tool 10.

As used herein, the term controller can refer to an application specific integrated circuit (ASIC), an electronic circuit, a processor (shared, dedicated, or group) and memory that executes one or more software or firmware programs, a combinational logic circuit, other suitable components and/or one or more suitable combinations thereof that provide the described functionality.

A transmission portion 48 of the tool extends from the housing 12 and includes additional components necessary for activating the tool and driving a fastener. In an embodiment, the transmission portion 48 may extend substantially perpendicularly from the housing 12. The transmission portion 48 includes a drive motor assembly 40.

The drive motor assembly 40 may be actuated by the control module or controller 16 to cause the driver member

72 to translate and impact a fastener F in the nosepiece assembly 24 so that the fastener may be driven into the workpiece W. The drive assembly 40 includes a motor 44 and a transmission gear system 46. The drive assembly 40 is enclosed in a drive assembly or transmission housing 48 disposed between a power source and the nosepiece assembly 24. Actuation of the power source may use electrical energy from a battery pack (not shown) that is removably mounted to the battery pack mount 42 to operate the motor 44 of the drive motor assembly 40 and the trigger assembly 28. The controller 16 is configured to control a supply of power from the power source to the motor 44 to initiate and activate the drive sequence or drive cycle upon receipt of the trigger signal.

Figure 3B:
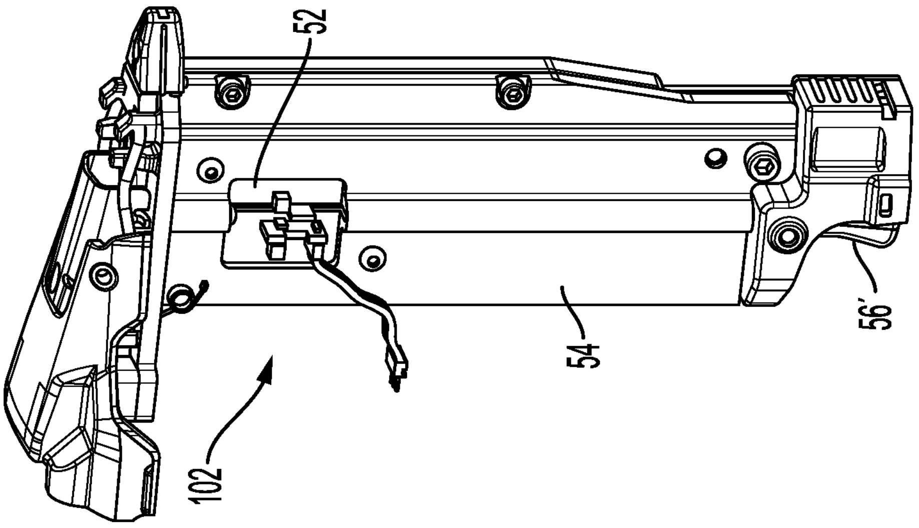
FIGS. 3A and 3B illustrate the magazine pusher position detection system on the magazine of the tool of FIG. 1.
Figure 3A:
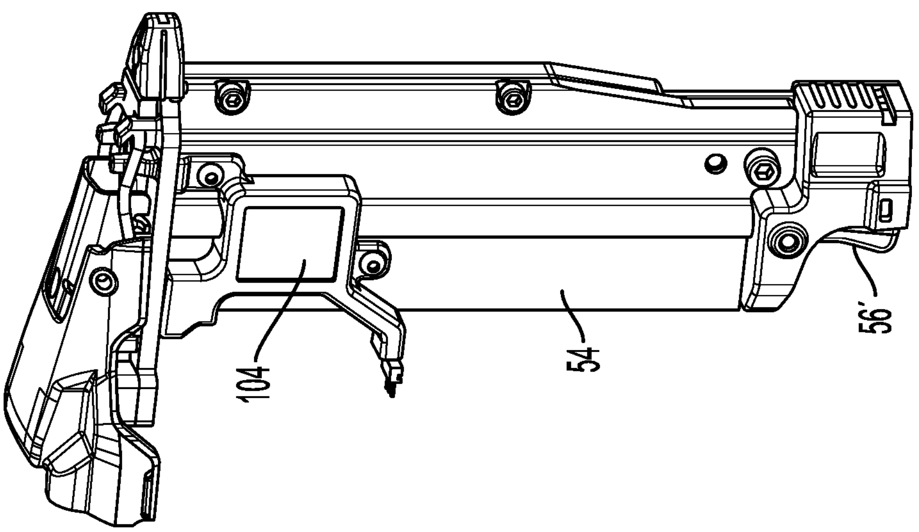

Fasteners are temporarily contained in the magazine assembly 14. As shown in FIGS. 1 and 2, the magazine assembly 14 can be connected to the nosepiece assembly 24. As shown in FIGS. 3A and 3B, the magazine assembly 14 includes a fixed magazine portion 52 and a movable magazine portion 54 slidably disposed on the fixed magazine portion. The fixed 52 and movable 54 magazine portions are held together by a magazine latch 56 or other magazine connecting member 56'.

Figure 4B:
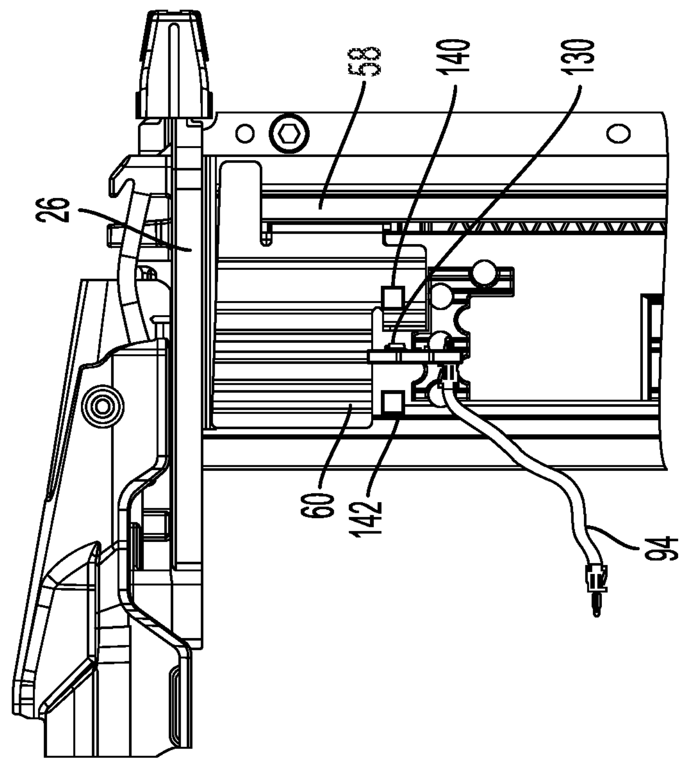
FIGS. 4A and 4B illustrate positions of the magazine pusher position detection system in the tool of FIG. 1.
Figure 4A:
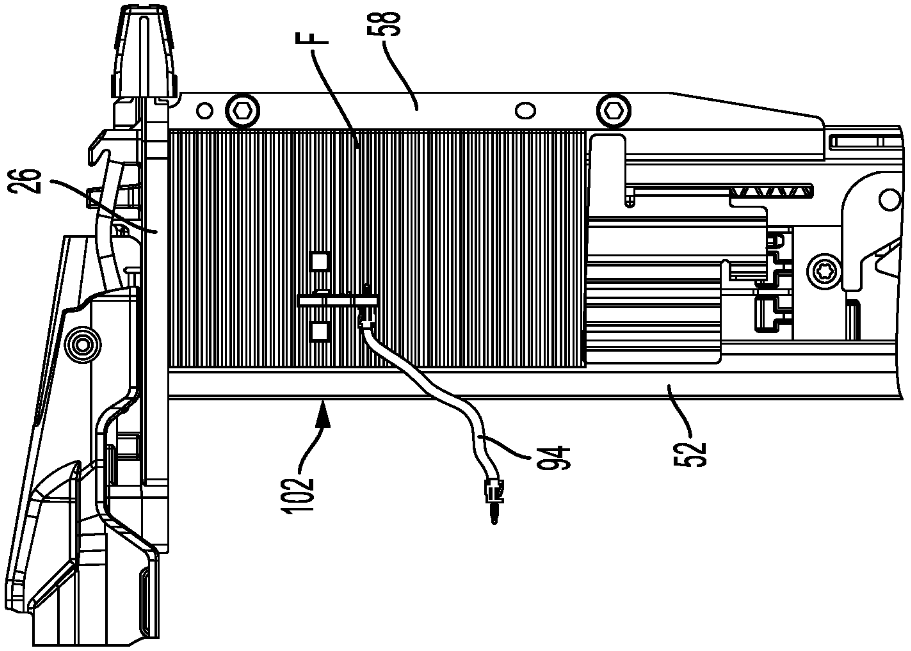
Figure 5A:
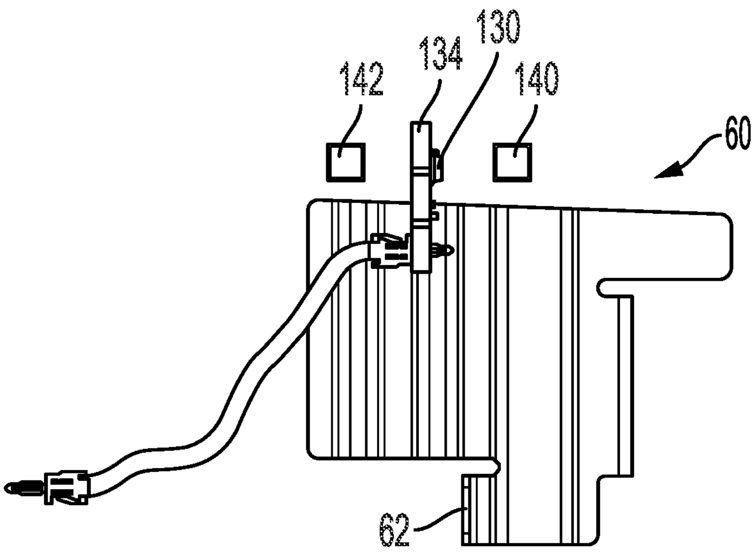
FIGS. 5A and 5B illustrate schematics of the positions of the magazine pusher position detection system in the tool of FIG. 1.
Figure 5B:
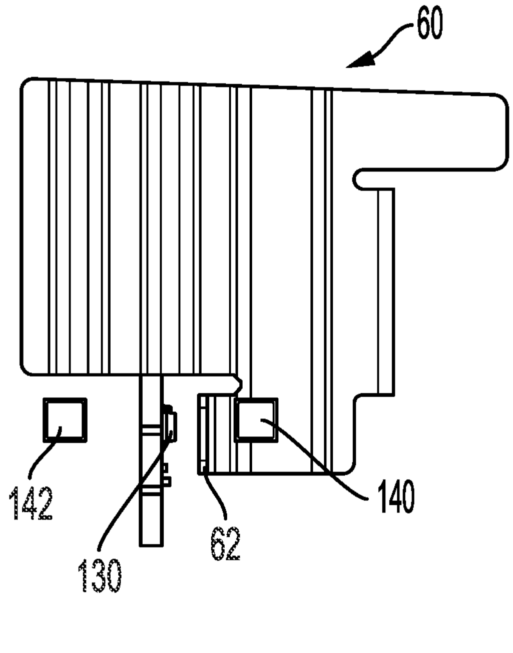

As shown in FIGS. 4A and 4B, the magazine assembly 14 is constructed and arranged to feed successive leading fasteners from a supply of fasteners inserted between the fixed 52 and movable 54 magazine portions, along a feed track or fastener channel 58 and into the drive track 26. In an embodiment, the supply of fasteners F can be collated fasteners.

The supply of fasteners F is urged toward the drive track 26 by at least one magazine pusher 60 in the magazine assembly 14. Alternatively, a plurality of magazine pushers can be slidably disposed in grooves in the magazine assembly 14. The magazine pusher 60 is biased toward the drive track in the nose portion 24*a* by a biasing member (not shown), such as a spring or plurality of springs that push respective pushers along the fastener channel 58 toward the drive track 26. The magazine pusher 60 has a front portion 64 that engages the fasteners F in the fastener channel 58 and a rear portion 66 that engages the biasing member. The number of fasteners F in the fastener channel 58 are depleted by, for example, being driven by the driver member 72 into a workpiece W. The magazine pusher 60 engages the last fastener in the supply of fasteners to thereby feed individual fasteners from the magazine assembly 14 to the drive track 26. When the last fastener in the supply of fasteners has been driven or less than a predetermined number of fasteners remain in the magazine assembly 14, the controller 16 activates or initiates a dry fire lockout state of the tool.

The dry fire lockout state of the tool is activated by the dry fire lockout assembly 100. The dry fire lockout assembly 100, when activated, prevents the motor 44 from starting and thereby inhibits the drive cycle. Inhibiting the drive cycle includes preventing the motor 44 from starting from an at-rest state and stopping the motor 44 from a running state during a drive cycle.

The dry fire lockout assembly 100 in the present invention can be housed in a housing 104 attached to the magazine 14 as shown in FIG. 3A. The dry fire lockout assembly 100 includes a magazine pusher position detection system 102 as shown in FIGS. 4A, 4B, 5A and 5B. The pusher position detection system 102 is part of the dry fire lockout assembly and can be mounted to or within the magazine assembly 14. In an embodiment of a fastening tool having a magazine assembly 14 including a fixed portion 52 and movable portion 54 slidably connected to the fixed portion, the pusher position detection system 102 can be mounted between the fixed and movable portions as shown in FIGS. 3A and 3B. The illustrated magazine assembly 14 is configured to receive fasteners that are collated in a stick configuration. It is also contemplated that a magazine assembly configured to accommodate fasteners that are collated in a coil formation may be used. The illustrated embodiment is not intended to be limiting in any way.

FIG. 4A illustrates the relationship between the magazine pusher 60 and the pusher position detection system 102 when there is a predetermined minimum number of fasteners in the magazine 14. As illustrated, the magazine pusher is remote from the pusher position detection system 102. As such, the controller 16 will continue to initiate a drive cycle.

FIG. 4B illustrates the relationship between the magazine pusher 60 and the pusher position detection system 102 when there is less than a predetermined minimum number of fasteners in the magazine 14. The controller 16 will initiate a lockout state of the fastening tool 10 when the magazine pusher 60 is in a position that indicates no fasteners, a predetermined lockout number of fasteners or less than a predetermined minimum number of fasteners, are present in the magazine assembly 14. Less than a predetermined number of fasteners includes zero (0) fasteners. In such a lockout state, the motor 44 is deactivated and the tool is prevented from driving a fastener F. This lockout state can make the user aware that a fastener F is not going to be driven and that it is appropriate to reload fasteners or to add more fasteners into the magazine assembly 14.

With reference to FIGS. 4A and 4B, the presence or absence of a predetermined minimum number of fasteners in the magazine assembly is determined by the position of the magazine pusher in the magazine assembly 14. As shown the pusher position detection system 102 of the dry fire lockout assembly 100 is disposed adjacent to the fastener channel 58. In the dry fire lockout assembly of the present embodiment, the pusher position detection system 102 detects the presence or absence of the magazine pusher 60 at a predetermined location in the fastener channel that is indicative of the number of fasteners in the magazine assembly.

The predetermined location is a lockout position. In the absence of the magazine pusher 60 in the lockout position, the controller 16 continues to initiate drive cycles. Conversely, the presence of the magazine pusher 60 in the lockout position activates the dry fire lockout assembly. The lockout position can be a location of the magazine pusher 60 in the fastener channel 58 when there is less than a predetermined minimum number of fasteners in the fastener channel. The lockout position is between the nose portion 24*a* and the rear portion 66 of the magazine pusher 60.

The lockout position of the pusher 60 informs and activates the pusher position detection system 102. The pusher position detection system 102 includes a first sensor target, a second sensor target and a sensor that are operatively connected to the magazine assembly. The first sensor target and the second sensor target either separately or combined have or generate a sensor target characteristic. The sensor senses the sensor target characteristic and sends a signal indicative of the characteristic to the controller 16. The controller 16, receives the signal and instructs the operation of fastening tool. In an embodiment, sensor targets have characteristics that can include a magnetic flux associated with each sensor target.

In an embodiment illustrated in FIGS. 4A, 4B, 5A, 5B, 6, 7 and 8, the sensor targets can be a reference magnet 140 and a coactive magnet 142. The reference magnet 140 and the coactive magnet 142 can be permanent magnets. In an embodiment, the sensor in the detection system can be a Hall effect sensor 130. The Hall effect sensor 130 can be mounted to a printed circuit board (PCB) 134.

The coactive magnet 142 is aligned with and cooperates with the reference magnet 140 to generate or establish a sensor target characteristic in the form of a magnetic field or magnetic flux. The Hall effect sensor can be programmed to sense either a north facing magnetic field or a south facing magnetic field. In the embodiment illustrated, the Hall effect sensor provided is programmed to sense a north facing magnetic field. Accordingly, the north polarity of the reference magnet is arranged to face the Hall sensor. The reference magnet 140 and coactive magnets 142, are arranged in a way that the Hall effect sensor can always sense the magnetic field of the reference magnet 140, in this case the north facing magnetic field, when there is no external interference of the magnetic field.

Figure 6:
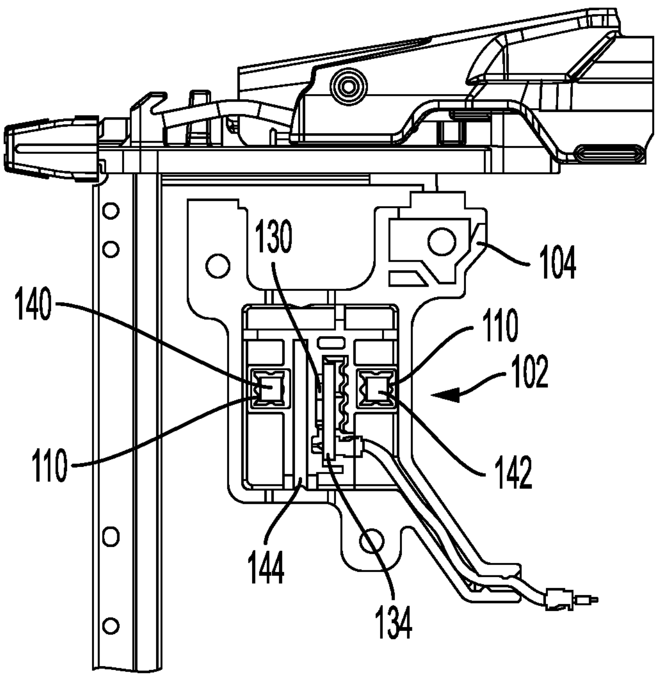
FIG. 6 illustrates inner surfaces of the magazine pusher position detection system housing of the tool of FIG. 1
Figure 7:
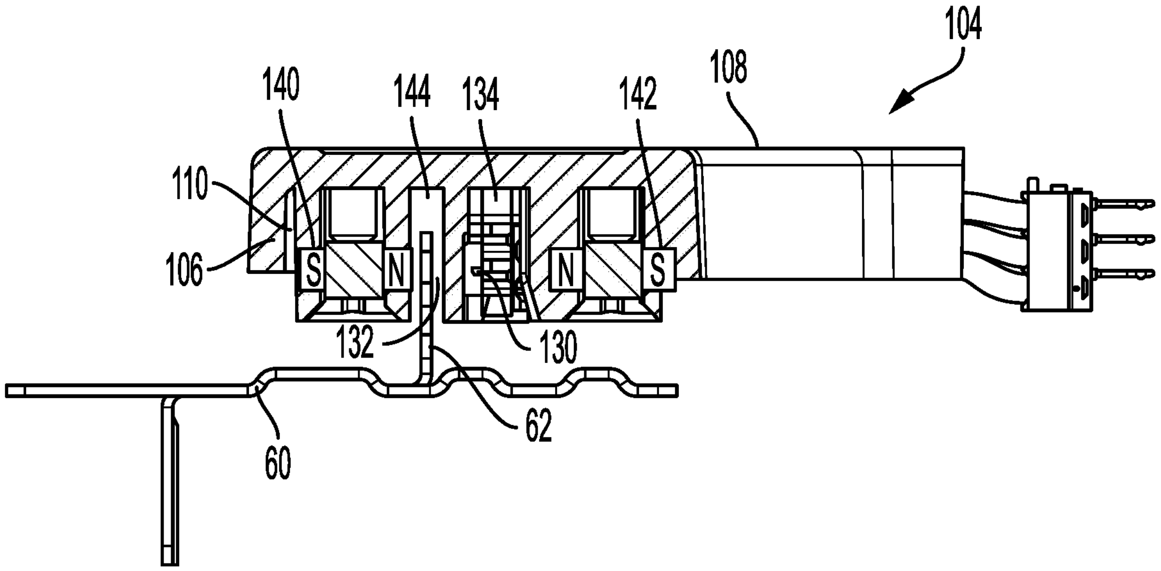
FIG. 7 is a cross-sectional view of the magazine pusher position detection system of the tool of FIG. 1.

As illustrated in FIGS. 6 and 7, the Hall effect sensor 130, the reference magnet 140 and the coactive magnet 142 are mounted inside of the system housing 104. The system housing 104 is an enclosure that has an inner surface 106 and an outer surface 108. In an embodiment, shown in FIG. 6, the inner surface has a plurality of recesses 110 for embedding components of the pusher position detection system 102. The PCB 134 and mounted Hall effect sensor 130, the reference magnet 140 and the coactive magnet 142 can be stationary and rigidly mounted to an inner surface and/or within a recess in the system housing 104.

As illustrated in FIGS. 6 and 7, the reference magnet 140 and the coactive magnet 142 are remote from the Hall effect sensor 130 and located in different recesses 110 on the inner surface 106 of the housing 104.

As shown in FIG. 7, the Hall effect sensor 130 has a sensing zone 132, within which the sensor 130 senses the change in magnetic flux of the reference magnet 140. An obstruction between the reference magnet 140 and the coactive magnet 142 results in a change in the magnetic flux sensed by the Hall effect sensor 130. In an embodiment of the fastening tool 10 described herein, the Hall effect sensor 130 detects or senses the change in magnetic flux when the magnetic field of the reference magnet 140 is interrupted by a portion of the magazine pusher 60 located in the lockout position. Interruption or disruption of the magnetic field of the reference magnet 140 by a portion of the magazine pusher 60 indicates a dry fire state to which the controller 16 inhibits the drive cycle.

With the presence of at least a predetermined minimum number of fasteners F to operate the tool, the pusher 60 is in a loaded position and thereby outside of or not engaged with the pusher position detection system 102. When the magazine pusher 60 is in the loaded position, the Hall effect sensor sends a signal to the controller 16 that indicates that there is not a "low nail" or "low fastener" condition so that when the trigger assembly 28 is pulled to activate a switch assembly 30, the controller 16 can instruct the motor 44 to begin the drive cycle.

Figure 8:
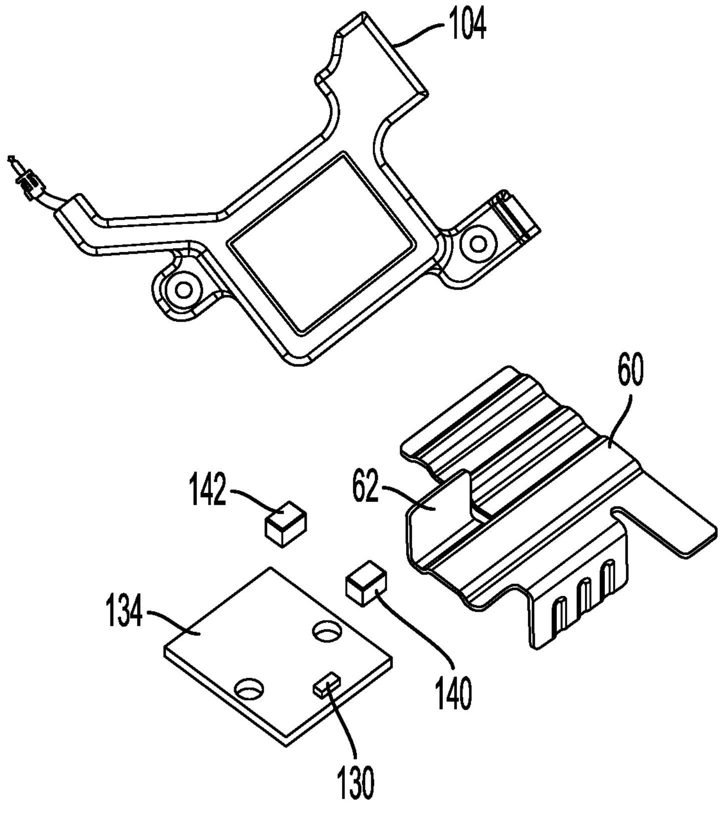
FIG. 8 is an exploded view of the magazine pusher position detection system in the tool of FIG. 1.

The system housing 104 includes an opening, such as a slot 144 that accommodates the portion of the magazine pusher 60 that obstructs the magnetic field of the reference magnet. The slot 144 is disposed between the Hall effect sensor 130 and one of the permanent magnets, for example, the reference magnet 140. In an embodiment, a front portion 64 of the magazine pusher can pass by the system housing 104 containing the pusher position detection system 102. However, when the number of fasteners in the fastener channel 58 reaches a predetermined minimum, a rear portion 66 of the magazine pusher 60 enters the slot 144. The rear portion 66 includes a pusher extension member 62. The pusher extension member 62 is a ferrous member that projects outwardly from the pusher 60 in the direction of the inner surface of the system housing 104. FIG. 8 illustrates an exploded view of the magazine position detection system 102 and a perspective view of the pusher extension member 62.

As the fasteners are depleted from the magazine 14 during each drive cycle, the pusher extension member 62 travels closer to the slot 144. The slot 144 is located in the magnetic field generated by the reference magnet 140 and coactive magnet 142. The slot is also located between the reference magnet 140 and the Hall effect sensor 130. When the pusher extension member 62 enters the slot 144, the pusher extension member gradually interrupts and eventually blocks the magnetic field of the reference magnet 140 from the Hall effect sensor 130. The pusher extension member 62 blocks the magnetic field of the reference magnet 140 when the member 62 reaches the predetermined lockout position. Blocking the magnetic field of the reference magnet 140 changes the magnetic flux sensed by the Hall effect sensor 130. An obstruction between the reference magnet 140 and the coactive magnet 142 caused by the magazine pusher extension member 62 can also result in a change in the magnetic flux. FIG. 7 illustrates an enlarged view of the pusher extension member 62 opposite to the Hall effect sensor 130 and interfering with the magnetic field of the reference magnet 140.

In an embodiment, the pusher position detection system 102 can be fixedly positioned with respect to the magazine pusher 60. In an alternative embodiment, the position detection system 102 can be adjustably positioned along the length of the fastener channel to vary the predetermined minimum number of fasteners that are necessary to actuate the tool. In a further embodiment, the pusher position detection system 102 can be mounted on the moving pusher and an extension member having a ferrous material projection configured to interrupt a magnetic field of a reference magnet can be fixed to a portion of the magazine.

Additionally, the blocking of the magnetic field of the reference magnet 140 causes a reversal of the magnetic field direction sensed by the Hall effect sensor 130. This reversal in the magnetic field direction trips the Hall effect sensor 130 to sense the lockout position of the magazine pusher 60 and send a signal to the controller 16 that there are no fasteners or less than a predetermined minimum number of fasteners in the magazine assembly. The Hall effect sensor is configured to send a signal to the controller 16 indicative of the change in magnetic flux caused by the obstruction.

The Hall effect sensor 130 can send or deny an activation signal to the controller 16 to activate and initiate a drive cycle of the fastening tool 10. If the magnetic flux corresponds to less than a predetermined number of fasteners in the magazine assembly, the Hall effect sensor sends a signal through a signal wire 94 to the controller 16. The controller in turn inhibits a drive cycle by instructing the motor 44 to turn off and the tool is prevented from actuating. Such a signal can be a digital signal that is one of a HIGH signal and a LOW signal. In an embodiment, the digital signal defines a different state of the tool. In a further embodiment, such a signal can be an analog signal having a range of voltages.

In an embodiment, the pusher 60 can be made of any material including but not limited to plastic and metal. In an embodiment, the pusher extension member 62 can be made of steel, ferrous steel or any ferrous material.

The members that respond to a condition of fastener quantity, as shown in can include a combination of magnetic sensors, magnets, and magnetic interference devices.

As shown in FIG. 4A, the magazine position detection system 102 is spaced apart from the nosepiece and defines how many fasteners can remain in the magazine before the magazine position detection system senses a "low nail" or "low fastener" condition and sends a signal to the controller 16 that activates a dry fire lockout of the tool. The closer the magazine position detection system 102 is to the nosepiece, the lower the predetermined minimum number of fasteners that are needed to activate the system 102. FIG. 4A illustrates a first position of the pusher 60 when the magazine is loaded with a predetermined minimum number of fasteners sufficient for the controller 16 to initiate a drive cycle. FIG. 4B illustrates a second position of the pusher 60 where there is less than a predetermined minimum number of fasteners in the magazine 14, resulting in the pusher extension member 62 interfering with the magnetic field of the reference magnet 140.

In an embodiment, within the system housing 104, the reference magnet 140 is located closer to the Hall effect sensor 130 than the coactive magnet 142. The Hall effect sensor signal through the signal wire 94 is a voltage signal, and the wires 90 and 92 are ground and voltage supply wires, respectively. The wires are connected to the PCB 134 through a board connector 136. The Hall effect sensor can be a contactless switch such that interfacing with the pusher extension member 62 causes the switch to send a signal to the controller 16. It will be appreciated, however, that any type of non-contact sensor, such as an Eddy-current sensor, or a contact-type sensor could be employed.

In operation, the user can drive a series of fasteners until a predetermined number of fasteners, or zero (0) fasteners are present in the magazine assembly 14 at which condition, the dry fire lockout system engages. The Hall effect sensor senses the change in magnetic flux of the reference magnet indicative of a less that a predetermined number of fasteners in the magazine and sends a signal to the controller 16. When the controller 16 receives the signal from the Hall effect sensor 130, the controller activates a dry fire lockout of the tool that inhibits the drive cycle. In particular, the controller 16 does not generate an activation or control signal to initiate the drive cycle, thereby preventing a fastener F from being driven. This circumstance can indicate to the user that it is appropriate to add one or more fasteners to the magazine assembly 14.

In an embodiment, the Hall effect sensor 130 also senses the state of the magazine assembly 14 when the tool is at rest. If the magnetic flux relative to the sensor corresponds to a state of the magazine assembly 14 having less than a predetermined number of fasteners, then the Hall effect sensor 130 will send a signal to the controller 16 indicative of the state of the magazine assembly 14 and the controller will inhibit the drive cycle. If the magnetic flux relative to the sensor corresponds to a state of the magazine assembly 14 having a predetermined number of fasteners, then the Hall effect sensor 130 will send a signal to the controller 16 indicative of the state of the magazine assembly 14 and the controller will initiate the drive cycle.

Although the pusher position detection system 102 is illustrates as being attached to between the fixed 52 and movable 54 portions of the magazine assembly 14, the pusher position detection system can also be attached to other parts of the magazine assembly 14 or the nose portion 24*a* of the nosepiece assembly 24. Additionally, although the two sensor targets are illustrated, any number of sensor targets or permanent magnets can be used in the system 102.

Figure 9:
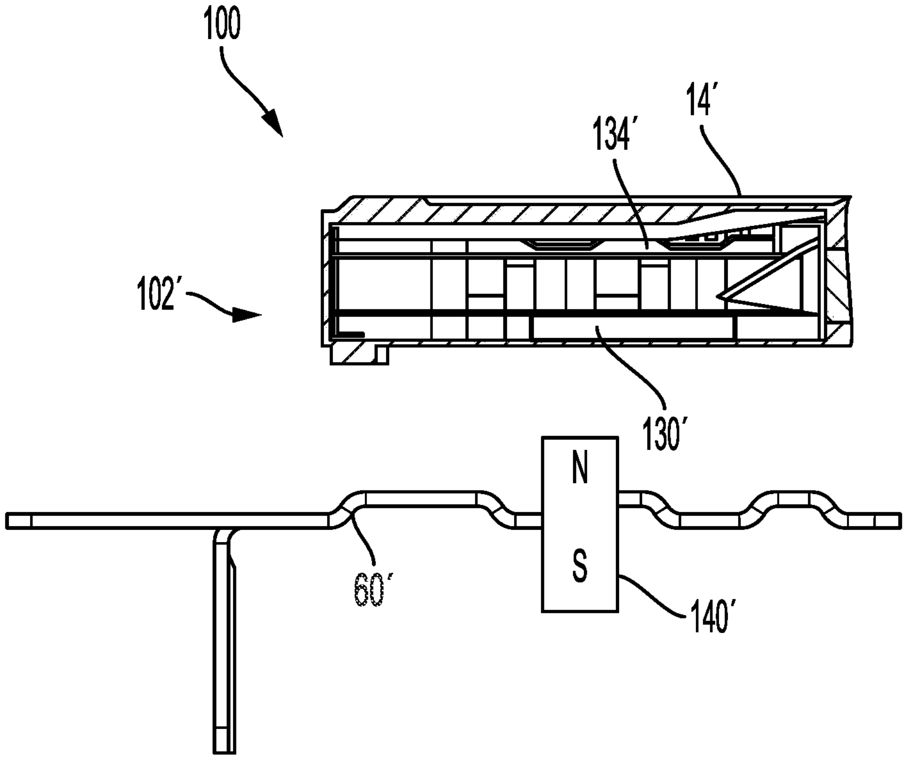
FIG. 9 illustrates a second embodiment of a magazine pusher position detection system that can be used in a fastening tool.

In another embodiment of a dry fire lockout assembly 100', as illustrated in FIG. 9, a magazine pusher position detection system 102' can be arranged so that a sensor, such as Hall effect sensor 130' is embedded in a portion of the magazine 14' and a reference magnet 140' is disposed on or embedded in the magazine pusher 60'. As the number of fasteners in the fastener channel reaches a predetermined minimum, the magazine pusher 60' containing the reference magnet 140' passes through the sensing zone of the sensor 130'. In this embodiment, the sensing zone can be located at the lockout position. The sensor 130' then sends a signal to the controller indicative of the "low fastener" condition and the controller inhibits the drive cycle.

Figure 10:
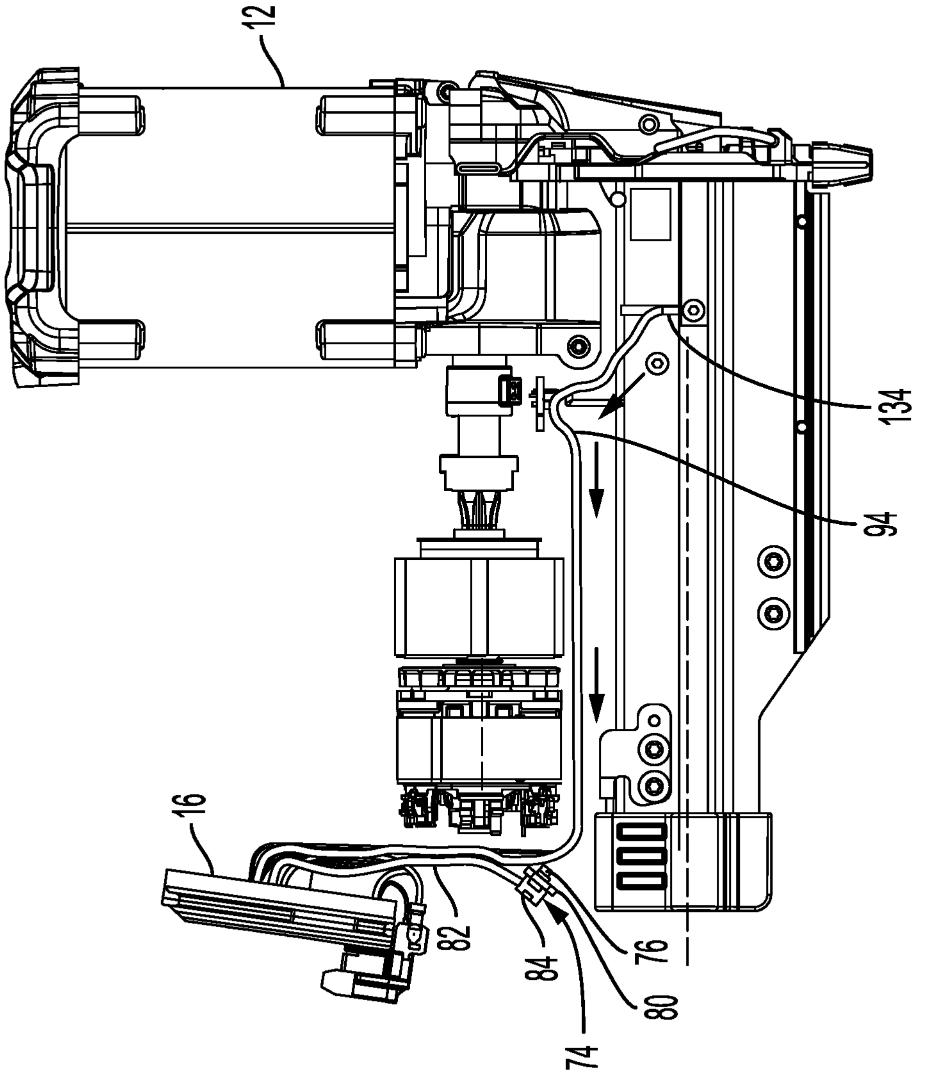
FIG. 10 illustrates the exemplary fastening tool of FIG. 1 with a portion of the housing removed showing an indicator light control.

As shown in FIG. 10, the dry fire lockout assembly 100 can further include a dry fire lockout indicator that activates to indicate to the user that additional fasteners must be loaded into the fastening tool 10, for example, into the magazine assembly 14, to resume a drive cycle. In operation, the Hall effect sensor 130 detects the magnetic flux between the magnets 140, 142 in any portion of the sensing zone 132. The magnetic flux sensed relative to the sensor 130 indicates whether the magazine assembly 14 has a predetermined number of fasteners or less than a predetermined of fasteners remaining. If the magnetic flux corresponds to less than a predetermined number of fasteners in the magazine assembly, the Hall effect sensor sends a signal through a signal wire 94 to the controller 16 to inhibit a drive cycle. The controller 16 processes the signal to inhibit the drive cycle thus preventing the fastening tool 10 from initiating a drive cycle. The controller 16 will also send a signal, such as through an indicator wire 82, to turn on the indicator. The dry fire lockout assembly 100, when activated, provides a visual indicator to the user that there are not enough fasteners in the magazine to commence a drive cycle to drive a fastener into the workpiece W.

In an embodiment, the indicator can be a light in the form of an LED 84. Activation of the LED 84 visually indicates the dry fire lockout state to the user. The LED 84 can be mounted on an LED circuit board 80 in an illumination section 74 of the tool housing. The LED circuit board can be disposed in an over-molded section of the housing. The LED light can be visible through a translucent portion, such as a lens 86 of the housing 12, for example. The LED light is disposed on one side of the LED circuit board 80 and receives an indicator activation signal from the controller 16 through an indicator wire 82 to activate.

The LED light 84 will activate each time the user pulls the triggers 32, 34 in the trigger assembly 28, and deactivate when the user releases the triggers, until a predetermined number of fasteners at or above a threshold amount for operation is provided in the magazine assembly 14. An opposite side of the LED circuit board contains a workpiece illumination LED 76 that can have a clear lens 78 for allowing light to project on and about the workpiece W.

The dry fire lockout lens or the dry fire lockout LED can have a color different from the color of the workpiece illumination lens or workpiece illumination LED in order to distinguish the lights. In an embodiment, the dry fire lockout LED can have a color such as, for example a primary color, such as red, yellow, that makes the user aware that a fastener is not going to be driven and that it is appropriate to reload fasteners or to add more fasteners into the magazine assembly 14. Similarly, in an embodiment the indicator can be an audible or vibratory indicator that makes the user aware that a fastener is not going to be driven and that it is appropriate to reload fasteners or to add more fasteners into the tool or the magazine assembly.

Figure 11:
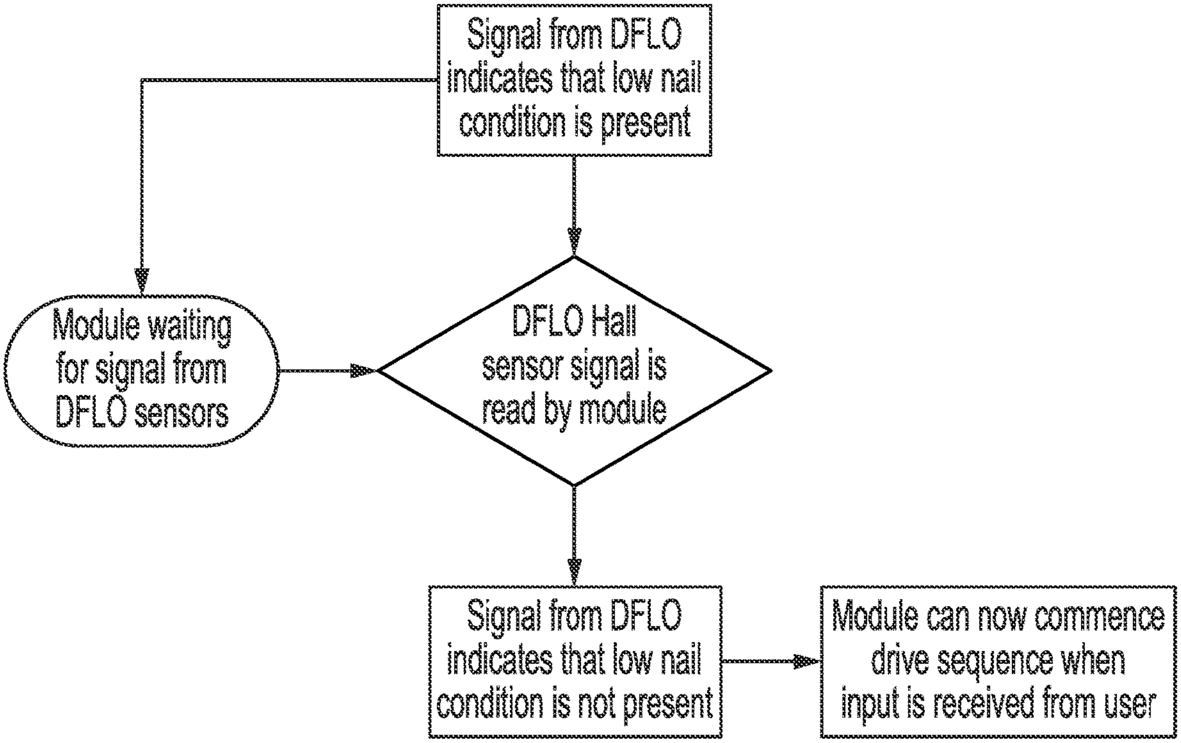
FIG. 11 is a flow chart indicating the flow of information from the Hall effect sensor to the controller.

As shown in the flowchart of FIG. 11, software in the controller 16 can prevent the fastening tool 10 from actuating when the magazine pusher 60 is in the lockout position indicating that a low nail condition is present. In this case, the Hall effect sensor 130 then sends a deactivation signal through the signal wire 94 to the controller 16 that processes the signal for a inhibiting the drive cycle and the dry fire lockout LED light can be activated. In this state, the controller 16 also sends the deactivation signal to motor 44 to turn off.

When more fasteners are loaded into the magazine assembly 14, the position of the pusher 60 is moved away from the lockout position and away from the Hall effect sensor 130. The Hall effect sensor 130 senses the change in relative magnetic flux of the reference and coactive magnets 140, 142. The Hall effect sensor thus senses the magnetic flux indicative of a predetermined number of fasteners being present in the magazine assembly. The Hall effect sensor 130 then sends an activation signal through the signal wire 94 to the controller 16 that processes the signal for a normal drive cycle and does not activate the dry fire lockout LED light. In this state, the controller 16 instructs the tool to initiate a drive cycle.

A Hall effect sensor is a non-limiting example of a magnetometer. A magnetometer can be used to achieve embodiments within the scope disclosed herein. A Hall effect sensor is a type of magnetometer. However, other magnetometers can be used in the disclosed dry fire lockout assembly 100. Additionally, a magnetoresistor or magnetoresistive sensor can be used in the disclosed dry fire lockout assembly 100. Broadly, a sensor that can sense a change in the magnetic field, flux and has an output that serves as a basis for operation decision can be used in the dry fire lockout assembly 100. Additionally, any sensor that senses a change in characteristic of a sensor target can also be used in the dry fire lockout assembly 100.

There is no restriction as to the type of Hall effect sensor that can be used. Herein, "Hall effect sensor" and "sensor" are used synonymously and interchangeably when referring to a magnetoresistive sensor. Hall effect sensors that can be used include for non-limiting example: a bipolar hall effect sensor, a linear Hall effect sensor, a discrete Hall effect sensor, a magnetoresistive Hall effect sensor. Hall effect sensors that have built-in amplifiers can be used. Hall effect sensors that do not have built-in amplifiers can also be used.

In an alternate embodiment, the Hall effect sensor can be in any orientation to the magnets such that when the magnetic field of one or both magnets is disrupted by a ferrous member, the flux that is sensed by the Hall effect sensor changes polarity, and causes the sensor to change the signal sent to the controller indicative of the tool being in a "low nail" or "low fastener" state.

Magnets and sensors could be incorporated into the tool at a variety of locations that allow movement of one or more magnets relative to the Hall effect sensor. This disclosure is not limited in regard to a means to place or fix one or more magnets for sensing by the Hall effect sensor. A magnet can be affixed to a member of the tool and/or the tool potting. In an embodiment, plastic can be molded over the magnet.

The magnets can be configured at various distances and in a number of configurations in relation to the Hall effect sensor. One magnet, or a number of magnets can be used to provide input to the Hall effect sensor. Magnets of different strengths and different polarities can be used.

In an embodiment, one or more N35 and/or N35SH magnets can be used. Magnets different from these can be used (e.g. Neodymium Iron Boron magnets). Also, magnetic sources that are not magnets can be used, e.g. magnetized plastics, or magnetically infused plastics (e.g. slider having magnetized portions, magnetized elements, magnetized components, or magnetized plastic portions).

While aspects of the present invention are described herein and illustrated in the accompanying drawings in the context of a fastening tool, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive cycle by starting the motor;

a first sensor target and a second sensor target operatively connected to the magazine assembly and having a sensor target characteristic; and a sensor configured to sense the sensor target characteristic of the first sensor target and send a signal to the controller in response to a change in the sensor target characteristic of the first sensor target, wherein when the controller receives the signal from the sensor, the controller inhibits the drive cycle by one of preventing the motor from starting, and stopping the motor during the drive cycle.

2. The fastening tool according to claim 1, further comprising a system housing that houses the first sensor target, the second sensor target and the sensor, the system housing being mounted to the magazine assembly.

3. The fastening tool according to claim 1, wherein the first and second sensor targets are permanent magnets.

4. The fastening tool according to claim 1, wherein the sensor target characteristic comprises a magnetic field.

5. The fastening tool according to claim 1, wherein the sensor is a Hall effect sensor.

6. The fastening tool according to claim 1, further comprising a projecting portion of the magazine pusher that interrupts the sensor target characteristic of the first sensor target to create the change in the sensor target characteristic.

7. The fastening tool according to claim 6, wherein the projecting portion of the magazine pusher projects outwardly from the magazine pusher.

8. The fastening tool according to claim 1, wherein the sensor has a sensing zone in which the sensor target characteristic is sensed.

9. The fastening tool according to claim 1, wherein the first sensor target is a reference magnet and the second sensor target is a coactive magnet that cooperates with the reference magnet to generate or establish the sensor target characteristic, and wherein the sensor is configured to sense the reference magnet and send a signal to the controller to initiate the drive cycle, and wherein the sensor is configured to sense the coactive magnet and send a signal to the controller to stop or not initiate the drive cycle.

10. The fastening tool according to claim 6, wherein the projecting portion of the magazine pusher is a ferrous material.

11. The fastening tool according to claim 6, wherein interrupting the sensor target characteristic comprises reversing a magnetic field direction.

12. The fastening tool according to claim 2, wherein the system housing comprises a slot separating the first sensor target from the second sensor target, and wherein the magazine pusher comprises a projecting portion that, within the slot, interrupts the magnetic field.

13. The fastening tool according to claim 12, wherein the magazine pusher is within the slot when there are a predetermined number to less than a predetermined number of fasteners in the magazine assembly.

14. A method of detecting a position of a magazine pusher to prevent a dry fire in a fastening tool having a nosepiece assembly including a fastener drive track having a drive axis, a magazine assembly including the magazine pusher slidably disposed in the magazine assembly for feeding a number of fasteners successively along a fastener channel to the fastener drive track of the nosepiece assembly, the magazine pusher having a projecting portion, and a controller configured to control a supply of power to the fastening tool and initiate a drive cycle, the method comprising:

providing a first sensor target and a second sensor target having a sensor target characteristic; and sensing the sensor target characteristic in a sensing zone and sending a first signal to the controller indicative of the sensor target characteristic to initiate a drive cycle by starting the motor; and sensing a change in the sensor target characteristic in the sensing zone and sending a second signal to the controller indicative of the change in the sensor target characteristic to inhibit the drive cycle by one of preventing the motor from starting, and stopping the motor during the drive cycle.

15. The method of claim 14, wherein sending the second signal comprises locating the projecting portion of the magazine pusher in the sensing zone.

16. The method of claim 14, wherein sending the first signal comprises sending an activation signal.

17. The method of claim 14, wherein sending a second signal comprises sending a deactivation signal.

18. The method of claim 14, wherein one of the first signal and the second signal can be one of a HIGH signal and a LOW signal.

19. The method of claim 14, wherein one of the first signal and the second signal can be one of a first voltage and a second voltage different from the first voltage.

20. The method of claim 14, wherein the sensor target characteristic is a north facing magnetic field and wherein the change in the sensor target characteristic is a change in magnetic flux of the first sensor target.

21. A magazine pusher position detection system comprising:

a system housing having a slot therethrough, the slot having a first side and a second side laterally opposite the second side;

a reference magnet disposed in the housing and on a first side of the slot, the reference magnet having a north polarity and north polarity magnetic field;

a coactive magnet disposed in the system housing and on a second side of the slot opposite to the first side of the slot, the coactive magnet having a north polarity facing the north polarity of the reference magnet; and a Hall effect sensor arranged on the second side of the slot to sense the north polarity magnetic field from the reference magnet, wherein an interruption of the north polarity magnetic field of the reference magnet inhibits a drive cycle.

22. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive cycle by starting the motor;

at least one sensor target operatively connected to the magazine assembly and having a sensor target characteristic; and a sensor configured to sense the sensor target characteristic of the at least one sensor target and send a signal to the controller in response to a change in the sensor target characteristic, wherein when the controller receives the signal from the sensor, the controller inhibits the drive cycle by one of preventing the motor from starting, and stopping the motor during the drive cycle.

23. The fastening tool according to claim 22, wherein the at least one sensor target is a permanent magnet.

24. The fastening tool according to claim 22, wherein the at least one sensor target comprises a magnetic field.

25. A fastening tool comprising:
- a housing;
- a nosepiece assembly connected to the housing and including a fastener drive track having a drive axis;
- a magazine assembly including a magazine pusher slidably disposed in the magazine assembly for feeding a number of fasteners successively along a fastener channel to the fastener drive track of the nosepiece assembly;
- a driver member provided in the housing and configured for movement along the drive axis to drive a lead fastener into a workpiece;
- a motor disposed within the housing and configured to drive the driver member along the drive axis;
- a power source providing power to the motor;
- a controller configured to control a supply of power from the power source to the motor and initiate a drive cycle;
- a first sensor target and a second sensor target operatively connected to the magazine assembly and having a sensor target characteristic that is a magnetic field; and
- a sensor configured to sense the sensor target characteristic of the first sensor target and send a signal to the controller in response to a change in the sensor target characteristic of the first sensor target,
- wherein when the controller receives the signal from the sensor, the controller inhibits the drive cycle.

* * * * *